United States Patent [19]
Nakashima et al.

[11] 3,909,228
[45] Sept. 30, 1975

[54] COMPOSITION FOR CONDITIONING SOIL

[75] Inventors: Todomu Nakashima; Naoki Takahashi, both of Kumamoto, Japan

[73] Assignees: Eisai Co., Ltd.; Kabushiki Kaisha Seikaken, both of Tokyo, Japan

[22] Filed: Mar. 14, 1974

[21] Appl. No.: 451,379

Related U.S. Application Data

[63] Continuation of Ser. No. 158,557, June 30, 1971, abandoned.

[30] Foreign Application Priority Data

Apr. 3, 1970  Japan.............................. 45-57724
June 22, 1971  Japan.............................. 46-44532

[52] U.S. Cl. ..................... 71/1; 71/33; 71/64 SC; 71/64 C
[51] Int. Cl.² ...................................... C05B 15/00
[58] Field of Search ............ 71/33, 1, 34, 64 C, 48, 71/64 SC

[56] References Cited
UNITED STATES PATENTS

| | | | |
|---|---|---|---|
| 3,022,154 | 2/1962 | Potts et al. ............................. | 71/34 |
| 3,160,495 | 12/1964 | Smith et al. ...................... | 71/64 C X |
| 3,244,500 | 4/1966 | Stinson et al. ...................... | 71/34 X |
| 3,635,835 | 1/1972 | Peterson .......................... | 71/64 C X |

*Primary Examiner*—Charles N. Hart
*Attorney, Agent, or Firm*—Wenderoth, Lind & Ponack

[57] ABSTRACT

The novel composition to be used for conditioning a barren and/or compact land of single grained structure soil to form a field or ground of crumbled structure of cloddy soil suitable for vegetation. The novel composition consists of a hydrophile high molecular organic polymer and a condensed phosphoric acid containing 73–87 per cent by weight of the acid based on $P_2O_5$, and optionally the compounds of metal or metals deficient in the soil, which are indispensable to the plant-growth. The composition itself also serves as a phosphorus fertilizer, and may further contain customary fertilizer, herbicide, insecticide and/or bactericide as additives.

5 Claims, No Drawings

COMPOSITION FOR CONDITIONING SOIL

This is a continuation of application Ser. No. 158,557, filed June 30, 1971, now abandoned.

This invention relates to an improved soil-conditioning composition. More particularly, it relates to an improved soil-conditioning composition comprising a hydrophile high molecular organic polymer and a condensed phosphoric acid. Furthermore, it relates to an improved soil-conditioning composition comprising a hydrophile high molecular organic polymer, a condensed phosphoric acid and minor amounts of the inorganic salts possessing fertilizing effect.

The term "hydrophile high molecular organic polymer" herein used contemplates the water-compatible synthetic high molecular orgaanic substances involving various nonionic, anionic and cationic substances. The term "condensed phosphoric acid" herein also used contemplates various polyphosphoric acids usually present in the form of a mixture comprising various polyphosphoric acids which should preferably contain 73–83 per cent by weight of the acid based on $P_2O_5$.

The improved soil-conditioning composition of the present invention physically converts a single grained structure soil into a crumble structure soil. The composition also serves as a fertilizer. Accordingly, the composition is parlicularly suitable for cultivation of plants.

Various soil-conditioning agents have been proposed and commercially available for converting a single grained structure soil into a crumble structure soil. As for the known soil-conditioning agents, there are exemplified the inorganic substance such as bentonite and zeolite; the organic substances of natural source, such as pectin, soluble starches, sodium alginate and humin as well as the synthetic organic polymers such as polyvinyl alcohol and polyacrylic acid derivatives and the like.

It has been found that these synthetic organic polymers, among others, are exceedingly desirable for converting a single grained structure soil into a crumble structure soil. However, it has been found that these organic polymers, when applied to such a single grained soil, show a tendency of gradually causing an excessive shrinkage of the once formed granular clods of the treated soil, owing to their insufficientwater-incompatibility. Germination of seeds and growth of the roots of a plant are thus retarded. In addition, a water-impermeable layer gradually formed beneath the layer of cultivating soil promotes the shrinkage of the said granular clods. The plant-growth is thereby considerably hindered.

On the other hand, it is known that the condensed phosphoric acids themselves such as those employed generally possess a dispersing property. It is also known that the condensed phosphoric acids can form the water-soluble chelate compounds with various polyvalent metals.

Now, we have observed that the effect of the hydrophile high molecular organic polymer on the conglomeration of the single grained structure soil is considerably increased when the polymer is used in conjunction with the condensed phosphoric acid. The observation is very surprising, because the organic polymers and the condensed phosphoric acids possess adverse properties each other with respect to their conglomerating and dispersing behaviors toward soil.

We have also found that the crumble structure soil formed by the application of a blend of the polymer and the condensed phosphoric acid can stand for a prolonged period of time without tightening to the dense granules.

The performance of the novel soil-conditioning composition of the present invention is indeed based on the observation of the above peculiar phenomenon.

A productive land suitable for cultivation, as is well known, should possess in its constitution a proper distribution of three phases, namely, the solid, liquid and gaseous phases. Also, such a land should contain the adequate amounts of nitrogen, phosphorus and potassium together with minute amounts of the compounds of Ca, Zn, Mn, Fe, Cu, Mo, etc. as the requisite metal.

It is known that customary phosphorus fertilizers containing orthophosphoric acid, when applied to the soil, suffer the drawback of forming sparingly water-soluble phosphates of metals ordinary present in soil. Under the circumstances, both the metals and the phosphorus fertilizer are left unavailable for plant-growth. Such a drawback appears particularly when the soil contains a relatively large amount of such metals.

By applying the novel soil-conditioning composition of the present invention, a single grained structure soil can advantageously be converted into a crumble structure soil, and at the same time, some certain metals usually present in the soil in an insoluble form can be converted into water-soluble chelate compounds available for fertilizing elements. Further advantage achievable by the use of the said composition is that if a soil is deficient in a certain metal or metals indispensable for vegetation, the wanted metals may advantageously be made up by providing a composition of the present invention, to which the salts of said desired metals have previously been added.

Generally, the most important matter to be taken care in fertilization is how to realize the highest fertilizing effect of the phosphate component contained in a given fertilizer, because the vegetative nutrition of the potassium and nitrogeneous components largely rely upon the fertilizing activity of the phosphorus component. In addition, the vegetative growth in plants largely depend upon the presence of minor amounts of certain metals in their available form. As an exemplification, molybdenum in its available form possesses the function of increasing the activity of the nitrate assimilable bacterium in the soil.

In an acid soil, molybdenum, however, is inactivated so that the activity of the particular bacterium is considerably restrained. Under such circumstances, a nitrogeneous substance applied to the soil in a form of ammonium salts or urea can not effectively utilized for the first stage plant-growth.

Such a drawback may readily be removed by utilizing the novel composition of the present invention, because the phosphate moiety of the composition will convert the molybdenum contained in the soil into its available chelate compound. Not only that, a soil deficient in molybdenum, such as aluminite soil, volcanic ash soil, etc., can be made fertile by applying the novel composition to which a molybdenum salt has previously been added.

It is therefore recognized that the novel soil-conditioning composition of the present invention is considerably useful for converting a single grained structure soil into a productive field of a crumble structure soil and that the said composition serves as a source of phosphorus and metallic elements required in vegetation.

In general, there are an indefinite variety of soils due to their individual originations that are physiographically different from one another with respect to their chemical constituents, pH-values, physical properties and so forth.

For these reasons, it is difficult, if not impossible, to obtain an all purpose or universal soil-conditioning agent which is commonly applicable for conditioning all sorts of soils. In other words, a certain given soil-conditioning agent which is effective for conditioning a particular soil having the proper characteristics would not always equally be effective for conditioning another sort of soil of different quality. Despite this fact, there is a great need for a soil-conditioning agent which is applicable to all sorts of soil, even if, such soils drastically differ from one another.

It may therefore be appreciated that the novel soil-conditioning composition of the present invention, as is recognisable from the above explanations, can satisfy the strong desire for a prefered soil-conditioning agent almost commonly applicable to all sorts of soil.

An additional advantage gained by the utilization of the composition of the present invention is that by virtue of the concurrent existance of the condensed phosphoric acid in the composition, it is possible to reduce the amount of the high molecular organic polymer required for conditioning an inferior single grained structure soil.

As already mentioned, the condensed phosphoric acid to be used in the particular soil-conditioning composition of the present invention may be a mixture of the probable various polyphosphoric acids preferably containing approximately 73–86 per cent by weight of the acids based on $P_2O_5$ or a partially neutralized product thereof. Such condensed phosphoric acids may be commercially available, or may be prepared, for example, by polymerizing orthophosphoric acid ($H_3PO_4$) or a mixture of the orthophosphoric acid and phosphorus pentoxide ($P_2O_5$) under heating. For the purpose of a partial neutralization of said condensed phosphoric acids, there may be advantageously employed among others potassium hydroxide or carbonate in view of the fertilization of the composition prepared therefrom.

In practice of the present invention, it should be understood that there is no critical limitation with respect to the relative proportion between the hydrophile high molecular organic polymer and the condensed phosphoric acid. The two components may thus be blended each other in an equal part by weight, or one of them may be employed in excess in relation to the other. In most cases, the condensed phosphoric acid is preferably employed excess within the range of 1–3 times by weight of the organic polymer.

The following experiments are illustrative of the effects of conglomeration caused by the combinations of several hydrophile high molecular organic polymers and the condensed phosphoric acid together with the comparisons on a soil dispersed in water to determine the ability of forming a crumble structure of a soil of the respective combinations. The soil was taken at the area of Kumamoto-prefecture, Japan.

Condensed phosphoric acid of 83.0 percent by weight of the acid based on $P_2O_5$ was employed, the composition of which is as follows:

| | | |
|---|---|---|
| Orthophosphoric acid | $H_3PO_4$ | 5.60 % |
| Pyrophosphoric acid | $H_4P_2O_7$ | 18.70 |
| Tripolyphosphoric acid | $H_5P_3O_{10}$ | 17.80 |
| Tetrapolyphosphoric acid | $H_6P_4O_{13}$ | 14.70 |
| Pentapolyphosphoric acid | $H_7P_5O_{16}$ | 12.00 |
| Hexapolyphosphoric acid | $H_8P_6O_{19}$ | 8.60 |
| Heptapolyphosphoric acid | $H_9P_7O_{22}$ | 7.20 |
| Octapolyphosphoric acid | $H_{10}P_8O_{25}$ | 5.10 |
| Nonapolyphosphoric acid | $H_{11}P_9O_{28}$ | 2.50 |
| High polyphosphoric acids | $H_{n+2}P_nO_{3n+1}$ ($\bar{n} \geq 10$) | 7.80 |

Hydrophilic organic polymers used were:

1. Polyacrylamide ($\bar{n} = 20,000$–$30,000$)
2. Diaclear MA-2010 (liquid)
   (Trade name; Mitsubishi Chem. Ind. Co.; Japan) Anionic; polymer partially hydrolized polyacrylamide
3. Sunfloc C-450 (powder)
   (Trade name; Froth Chem. Co.; Japan) Cationic polymer
4. Sunfloc N-50P (powder)
   (Trade name; Froth Chem. Co.; Japan) Nonionic polymer
5. Sunfloc AA-300D (powder)
   (Trade name; Froth Chem. Co.; Japan) Cationic polymer
6. Sunfloc AH-200D (powder)
   (Trade name; Froth Chem. Co.; Japan) Anionic polymer
7. Separan AP30 (powder)
   (Trade name; The Dow Chem. Co.; U. S. A.) Anionic polymer
8. Konanfloc ZP-900 (liquid)
   (Trade name; Konan Chem. Co.; Japan) Anionic polymer
9. Konanfloc 2000B (liquid)
   (Trade name; Konan Chem. Co.; Japan) Nonionic polymer
10. Konanfloc 3000 (liquid)
    (Trade name; Konan Chem. Co.; Japan) Nonionic polymer
11. Aronbis M ($\bar{n} = 15,000$–$20,000$ powder)
    (Trade name; Toagosei Chem. Ind. Co.; Japan) Anionic polymer The polymers 1–11 will be denoted hereinafter by "PM-1"~"PM-11."

1. Solution (A) of condensed phosphoric acid was prepared by neutralizing about 85 percent of the condensed phosphoric acid with an adequate amount of an aqueous solution of KOH. The resulting solution (A) had the composition:

| | |
|---|---|
| $P_2O_5$ | 15% by weight |
| $K_2O$ | 14 |
| $H_2O$ | 71 |

2. Eleven organic polymer solutions (B) of the above-mentioned polymers 1–11 inclusive were prepared by dissolving each 1 g of the powders in each 100 cc of water or by dissolving the respective liquids into 5 times by volume of water.

3. Eleven solutions (C) were separataly prepared by mixing the above solution (A) with the respective solutions (B) in the proportion of 1 : 5 by volume. The resulting solutions (C) were diluted with water to make up a 1000 time dilution (Testing solutions D).

It is therefore acknowledged from the above that each of the testing solutions (D) contained 15%/6000 = 0.0025% of $P_2O_5$, on the one hand, and also 1%/12000 = 0.00083% of the respective polymer.

4. A solution of the condensed phosphoric acid (E) for control was prepared by diluting the above solution (A) with water to make up a 6000 time dilution. The resulting solution (E) contained 0.0024percent of $P_2O_5$, 0.0025

5. Eleven solutions (F) for control of the respective polymers 1–11 were prepared by diluting each of the solutions (B) with water to make up a 1200 time dilution. It is acknowledged that each of the control solutions (F) contained 0.00083 percent of each of the polymers.

By using the above solutions (D), (E), and (F), the experiments on sedimentation of the specified soil were conducted as follows:

Each 20 g of the soil were weighed respectively in 24 measuring glass cylinders of 100 cc capacity and of the same size.

To one of which was then added tap water to make up 100 cc of total volume for control (1).

To another one of the cylinders was added the solution (E) of the polyphosphoric acid to make up 100 cc of the total volume for control (2).

To each of the other 11 cylinders were added respectively the individual solutions (F) to make up each 100 cc of the total volume, (Test Nos. 3–12).

To each of the remaining eleven cylinders were added respectively the individual testing solutions (D), (Test Nos. 3'–12').

All the 24 cylinders were well shaken to obtain the suspensions of soil, allowed to stand on a table, and inspected visually the volumes in cc occupied by the sedimented soil during the periods of time.

The results obtained are listed in the following Table:

From the date given in the Table, it is noted:

a. Sedimentation velocity of the soil in the aqueous suspension as shown in Control-1 is markedly retarded by the addition of the condensed phosphoric acid (Control-2), and furthermore, the final set of soil is almost not affected by the addition of the condensed phosphoric acid;

b. Sedimentation velocities of soil in comparison with the aqueous suspension (1) are increased by the addition of respective hydrophilic polymers (Test Nos. 1–11), and the final set volumes (cc) of the soil in the aqueous medium are increased by the addition of the polymers. The fact implies that the polymers themselves are effective to promote the conglomeration of the fine particles of soil resulting in the clod of larger sizes of soil, and that the degrees of effecting the promotion of the conglomerations differ depending upon the characteristics of the individual polymers, and finally;

c. A marked increment in the final set volumes of the sedimented soil are established by the concurrent additions of the hydrophile high molecular organic polymers and the condensed phosphoric acid (Test Nos. 1'–11').

It should be understood that the compositions of the present invention may be incorporated with fertilizer in particular nitrogeneous fertilizer such as area, and also pesticide, herbicide and/or bactericide.

Table

| No. of Cylinder | Composition of Content | Volumes in cc of Soil sedimented (seconds) | | | | (minutes) | | | | | | Per Cent(%) Increment*** |
|---|---|---|---|---|---|---|---|---|---|---|---|---|
| | | 0 | 10 | 20 | 30 | 1 | 2 | 3 | 4 | 5 | 10 | 60 | |
| (control-1) | water + soil | 100 | 96 | 93 | 91 | 90 | 82 | 75 | 70 | 66 | 47 | 29 | |
| (control-2) | water + soil + CPA** | 1 (day) 31 | | 2 (days) 31 | | 3 (days) 30 | | 4 (days) 30 | | 5 (days) 30 | | | |
| 1 | water + soil + PM*-1 | 100 | 83 | 67 | 50 | 40 | 38 | 38 | 38 | 38 | 38 | 37 | |
| 1' | water + soil + PM-1 + CPA | 100 | 76 | 55 | 48 | 45 | 44 | 44 | 44 | 44 | 43 | 43 | 16 |
| 2 | water + soil + PM-2 | 100 | 84 | 73 | 61 | 46 | 41 | 39 | 39 | 39 | 38 | 38 | |
| 2' | water + soil + PM-2 + CPA | 100 | 75 | 57 | 50 | 46 | 45 | 44 | 44 | 44 | 44 | 44 | 16 |
| 3 | water + soil + PM-3 | 100 | 94 | 85 | 73 | 45 | 37 | 36 | 35 | 35 | 35 | 35 | |
| 3' | water + soil + PM-3 + CPA | 100 | 80 | 70 | 57 | 45 | 42 | 41 | 41 | 41 | 41 | 40 | 14 |
| 4 | water + soil + PM-4 | 100 | 90 | 82 | 62 | 45 | 39 | 38 | 38 | 37 | 37 | 37 | |
| 4' | water + soil + PM-4 + CPA | 100 | 72 | 54 | 49 | 45 | 44 | 43 | 43 | 43 | 43 | 43 | 16 |
| 5 | water + soil + PM*-5 | 100 | 90 | 80 | 67 | 45 | 38 | 37 | 36 | 36 | 36 | 36 | |
| 5' | water + soil + PM-5 + CPA** | 100 | 75 | 59 | 49 | 43 | 42 | 42 | 41 | 41 | 41 | 41 | 14 |
| 6 | water + soil + PM-6 | 100 | 82 | 69 | 56 | 45 | 41 | 41 | 41 | 40 | 40 | 40 | |
| 6' | water + soil + PM-6 + CPA | 100 | 63 | 54 | 50 | 48 | 47 | 47 | 47 | 47 | 47 | 47 | 18 |
| 7 | water + soil + PM-7 | 100 | 80 | 59 | 49 | 39 | 37 | 36 | 36 | 36 | 35 | 35 | |
| 7' | water + soil + PM-7 + CPA | 100 | 60 | 48 | 45 | 43 | 42 | 42 | 42 | 42 | 41 | 41 | 17 |
| 8 | water + soil + PM-8 | 100 | 89 | 76 | 64 | 43 | 38 | 37 | 36 | 36 | 36 | 36 | |
| 8' | water + soil + PM-8 + CPA | 100 | 80 | 63 | 51 | 43 | 42 | 41 | 41 | 41 | 41 | 41 | 14 |
| 9 | water + soil + PM-9 | 100 | 80 | 62 | 49 | 43 | 42 | 42 | 41 | 41 | 41 | 41 | |
| 9' | water + soil + PM-9 + CPA | 100 | 65 | 53 | 49 | 48 | 47 | 47 | 47 | 47 | 47 | 47 | 15 |
| 10 | water + soil + PM-10 | 100 | 67 | 43 | 40 | 38 | 38 | 38 | 38 | 38 | 37 | 37 | |
| 10' | water + soil + PM-10 + CPA | 100 | 53 | 49 | 45 | 45 | 45 | 45 | 45 | 45 | 45 | 44 | 19 |
| 11 | water + soil + PM-11 | 100 | 82 | 73 | 61 | 54 | 42 | 33 | 32 | 31 | 31 | 31 | |
| 11' | water + soil + PM-11 + CPA | 100 | 80 | 62 | 48 | 39 | 37 | 37 | 37 | 37 | 36 | 36 | 16 |

*PM Polymer
**CPA Condensed phosphoric acid
***Superiorty(%) of increment in the final set volumes of soil caused by condensed phosphoric acid(CPA) plus polymers PM-1~PM-11) as compared with that caused by polymers (PM-1~PM-11) alone.

The following examples illustrate the specific soil-conditioning compositions of the present invention.

EXAMPLE 1

63.6 kg of condensed phosphoric acid containing 83.0 percent by weight of the acid based on $P_2O_5$ were diluted with 200 kg of water at ordinary temperature.

About 85 percent of the condensed phosphoric acid in the resulting solution were neutralized by slowly adding an aqueous solution of 63 kg of KOH. The whole was then made up to 350 kg with addition of water.

To the solution was added with agitation 450 kg of a 5 percent aqueous solution of a polyacrylamide having average polymerization degree of approximately 30,000. Agitation of the resulting mixture (80 kg) were continued at ordinary temperature until a homogeneous solution was obtained. The solution had the following constitution, per cent being by weight:

| | |
|---|---|
| condensed phosphoric acid based on $P_2O_5$ | 7.95% |
| KOH | 7.6 |
| Polyacrylamide | 2.8 |
| $H_2O$ | 81.65 |

The composition is usually applied to soil after dilution with 100–1000 times of water.

In the spread soil, the phosphorus and potassium contained in the composition gradually serve as fertilizer.

EXAMPLE 2

560 kg of the 5 percent aqueous solution of polyacrylamide same as that employed in Examle 1 were added with stirring at ordinary temperature to 350 kg of an aqueous solution having the formulation:

| | |
|---|---|
| Polyphosphoric acid (same as that used in Example 1) | 69 kg |
| KOH | 66 |
| Additive-A | 20 |
| water | 220 |
| Total | 375 |

110 kg of urea were then added to the mixture and the whole (1020 kg) was stirred for two hours.

Additive-A used in this example had the following constitution:

Additive-A

| Components | Parts by weight |
|---|---|
| Ferric nitrate | 18.6 |
| Cupric nitrate | 5.0 |
| Zinc nitrate | 6.1 |
| Manganese sulfate | 43.2 |
| Magnesium sulfate | 156.0 |
| Ammonium molybdate | 2.4 |
| Citric acid | 7.2 |
| Boric acid | 9.0 |
| Water | 352.5 |
| Total | 600.0 |

If desired, the relative proportions of any of the compounds in the formula may be changed, and some of them may be substituted by other compounds, and furthermore, any other compounds may be added thereinto.

The resulting composition after diluted with an appropriate amount of water may be used for conditioning soil.

EXAMPLE 3

An aqueous solution of potassium polyphosphate was prepared by treating 137 kg of a condensed phosphoric acid containing 83 percent by weight of the acid based on $P_2O_5$ with an aqueous solution of 133 kg of KOH. To 100 kg of the resulting solution were added 650 kg of water and then 100 kg of a 5 percent aqueous solution of polyacrylamide having the average polymerization ($\bar{n}$) of 30,000. The whole was stirred at room temperature for 3 hours. A sufficient amount of ethanol was slowly introduced with stirring to the solution to form a precipitate. When the precipitation was completed, the precipitate was recovered by filtration and dried under reduced pressure at about 1 mmHg. There was obtained 35 kg of the desired composition in a form of white powder.

When used, the composition is dissolved in a 500–5,000 times volume of water.

EXAMPLE 4

To the same aqueous mixture of potassium polyphosphate and polyacrylamide as that obtained intermediately in the step preceding the treatment with alcohol in Example 3, there was gradually added with stirring Additive-B having the following composition:

Additive-B

| Components | |
|---|---|
| Magnesium sulfate | 750 g |
| Manganese sulfate | 83 g |
| Cupric sulfate | 21 g |
| Zinc sulfate | 26 g |
| Ammonium molybdate | 6 g |
| Ferric nitrate | 100 g |
| Water sufficient to make up the total | 20,000 ml |

The resulting pale greenish solution was agitated for additional 1 hour, and 11 kg of urea were then added to obtain a clear solution. To the solution, ethanol was gradually added to form a precipitate. When the precipitation was complete, the precipitate was recovered by filtration, which was then dried under reduced pressure at about 1 mmHg.

There was obtained 47 kg of a pale greenish powder. The product may be utilized as a soil-conditioner for the same purpose as that mentioned in the preceding examples.

TEST ON SOIL

Effects of the composition (Composition A) obtained in Example 1 on riverine allovium soil taken at the area of Kumamoto-prefecture, Japan, were determined withh (a) the conglomeration and (b) the distribution between the three phases, i. e., the solid, liquid and gaseous phases, as follows:

Each 35 kg of the soil sample passed through a 5 mm mesh sieve, were filled in two wooden boxes (a) and (b) having the same dimensions.

To the box (a) were spread 5 liters of an aqueous soil-conditioner prepared by diluting Composition A with 150 times by volume of water. It was appreciated that the diluted aqueous soil-conditioner thus obtained had 2.8%/150 of the polymer.

To the box (b) were apread 5 liters of tap water as control.

The two boxes were held under the same conditions for 10 days. From the boxes, each sample of the soils was respectively taken at the six separate positions. With the samples, the following tests were conducted:

a. Separation of the conglomerated granules

The test was conducted in accordance with the Yoder method. The following distribution of clods was thus observed:

| Size of the granules (diameter in mm) | Soil from Box a) (%) | Soil from Box b) (control) (%) |
|---|---|---|
| >2 | 2.6 | 0.5 |
| 2 – 1 | 7.5 | 1.9 |
| 1 – 0.5 | 17.5 | 4.4 |
| 0.5 – 0.25 | 21.1 | 8.6 |
| 0.25 – 0.1 | 18.2 | 10.1 |
| <0.1 | 33.1 | 83.5 |
| Total | 100.0% | 100.0% | b. Three phases distribution

Three phase distribution was carried out on the soils in accordance with the customary method. The results obtained are listed bellow; wherein the total void space is the sum of the fractions (%) of the liquid and gaseous phases.

| | Solid Phase (%/v) | Liquid Phase (%/v) | Gaseous Phase (%/v) | Total Void (%/v) |
|---|---|---|---|---|
| Soil from Box a) | 41.2 | 40.6 | 18.2 | 58.8 |
| Soil from Box b) (control) | 56.9 | 35.0 | 8.1 | 43.1 |

It is obvious from the above experiments, that the use of the soil-conditioning composition of the present invention affords an effective conglomeration of the soil particles, an increased water maintenance and an increment in the void space and consequently an enlargement of total vancance are achieved in the resulting clods.

Although the invention has been illustrated by the preceding Examples as well as the utilization of the novel compositions obtained thereby, the invention is not to be construed as limited to the materials employed therewith, but rather, the invention encompasses the generic area as hereinbefore disclosed. Various modifications and embodiments of this invention can be made without departing from the spirit and scope thereof.

What is claimed is:

1. A soil conditioning composition consisting essentially of a condensed phosphate containing 73–87 percent $P_2O_5$ by weight and a polyacrylamide or partially hydrolyzed product thereof, wherein the condensed phsophate is employed in a range 1–3 times the weight of the polyacrylamide or partially hydrolyzed product thereof.

2. A soil-conditioning composition as claimed in claim 1 wherein the composition further contains a salt or salts of Fe, Cu, Zn, Mn, Mg and Mo.

3. A soil-conditioning composition as claimed in claim 1 wherein the condensed phosphate acid is partially neutralized with a compound of an alkali or alkaline earth metal.

4. A soil-conditioning composition as claimed in claim 1 wherein the composition is in a liquid or solid form.

5. A soil-conditioning composition as claimed in claim 1 wherein the composition further contains a nitrogeneous fertilizer, herbicide, insecticide and/or bactericide.

* * * * *